Mar. 3, 1925.
E. NAIRNE
GASOLINE GAUGE
Filed June 9, 1922
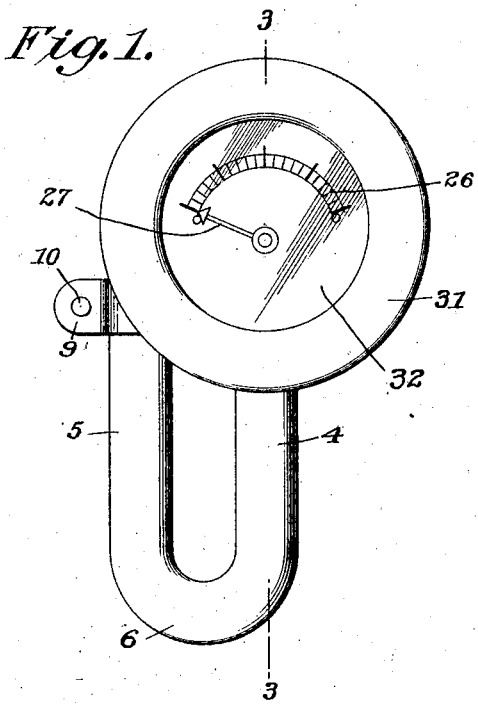
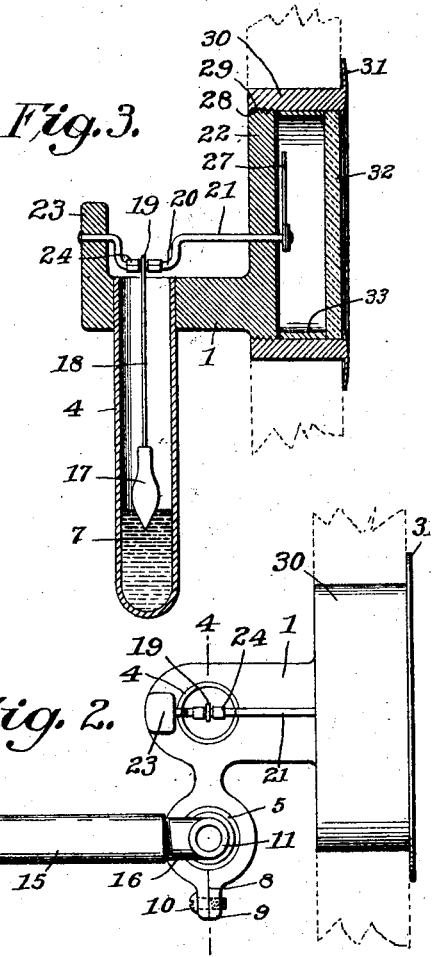
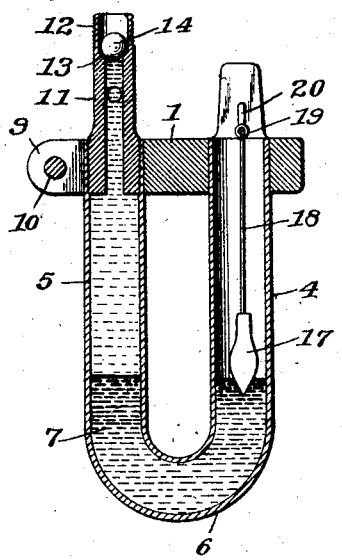
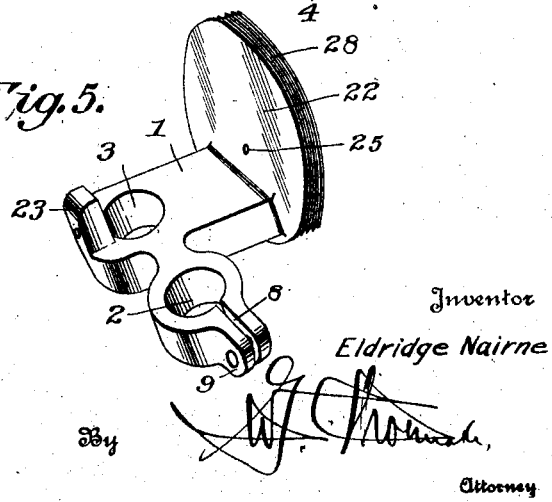
Inventor
Eldridge Nairne
By
Attorney Patented Mar. 3, 1925.

1,528,163

UNITED STATES PATENT OFFICE.

ELDRIDGE NAIRNE, OF ROXBURY, MASSACHUSETTS, ASSIGNOR TO DAVID FINKLE-STEIN, OF BOSTON, MASSACHUSETTS.

GASOLINE GAUGE.

Application filed June 9, 1922. Serial No. 567,116.

*To all whom it may concern:*

Be it known that I, ELDRIDGE NAIRNE, a citizen of the United States, residing at Roxbury, in the county of Suffolk and State of Massachusetts, have invented new and useful Improvements in Gasoline Gauges, of which the following is a specification.

The invention relates to a gasoline gauge.

The object of the present invention is to improve the construction of gasoline gauges and to enable the same to be manufactured in an inexpensive, practical and durable manner with the parts arranged so that the inclination and momentum of a motor vehicle, during the running of the same, will not affect accuracy of the gauge.

A further object of the invention is to provide a gasoline gauge of this character adapted to be readily applied to the dash or instrument board of an automobile or other vehicle and equipped with a graduated scale and movable pointer or hand whereby a clear reading of the gauge will be afforded at all times.

With these and other objects in view the invention consists in the construction and novel combination and arrangement of parts hereinafter fully described, illustrated in the accompanying drawings and pointed out in the claims hereto appended, it being understood that various changes in the form, proportion and minor details of construction, within the scope of the claim, may be resorted to without departing from the spirit or sacrificing any of the advantages of the invention.

In the drawings, in which like characters of reference designate corresponding parts in the several views:—

Figure 1 is a front elevation of a gasoline gauge constructed in accordance with this invention.

Figure 2 is a plan view of the same.

Figure 3 is a vertical sectional view on the line 3—3 of Figure 1.

Figure 4 is a vertical sectional view on the line 4—4 of Figure 2, showing the arrangement of the float when the gasoline of a tank is at its lowest level.

Figure 5 is a detail perspective view of the body, the U-shaped tube being removed.

In the accompanying drawing in which is illustrated the preferred embodiment of the invention, the gasoline gauge, which is designed for general use for indicating the level of gasoline within a tank or other source of supply, is especially adapted for use on automobiles and other motor vehicles and it comprises in its construction a body 1, preferably consisting of a die casting of any suitable material provided with spaced parallel approximately vertical openings 2 and 3 for the reception of the legs 4 and 5 of a U-shaped tube 6. The U-shaped tube 6, which is composed of the legs and a connecting portion, is designed to contain a liquid body 7 of mercury or other suitable substance and the upper ends of the legs 4 and 5 are secured in the openings 2 and 3 of the body. The body is split at 8 at one side of the openings 3 and is provided thereat with spaced projecting lugs 9, which are connected by a screw 10 threaded into one of the lugs and adapted to draw the split portion of the body together to cause the body to clamp the leg 5 of the U-shaped tube. The split portion of the body and the lugs constitute clamping jaws and the clamp formed by the same and the screw enables the U-shaped tube to be easily and quickly applied to the body.

The body may be placed in either a vertical or inclined position to suit the position of the dash or instrument board of an automobile and the U-shaped tube is arranged transversely with respect to the vehicle so that the legs of the tube are arranged in transverse alignment whereby the momentum of the vehicle will not affect the mercury within the U-shaped tube, as it will act equally on the mercury contained in both of the legs of the tube.

The leg 5 of the U-shaped tube is interiorly threaded at its upper end for the reception of a valve fitting, preferably consisting of a substantially T-shaped coupling or member 11 having one of its opposite arms or portions screwed into the upper end of the leg 5 of the U-shaped tube. The oppositely projecting portions of the U-shaped member are arranged in a substantially vertical position and the upwardly projecting arm or portion is exteriorly threaded at 12 and is provided with an interiorly arranged valve seat 13 with which cooperates a ball 14. The exteriorly threaded portion 12 is adapted to receive an ordinary pump for exhausting the air from a pipe or tube 15, which is connected with the arm or portion 16 of the T-shaped member 11. The arm or portion 16 is exteriorly threaded, as shown, for the connection of the pipe 15 which extends to the gasoline tank of an automobile or other source of supply and when the air is exhausted from the pipe 15 gasoline from the tank will be drawn into the supply pipe 15 and into the leg 5 of the U-shaped tube 6 and will form a continuous column or body of liquid extending from the mercury in the leg 5 to the tank.

After the air has been completely exhausted from the leg 5 of the U-shaped tube and from the vacuum or suction pipe or tube 15, there will be a siphon action tending to pull the gasoline in the vacuum or siphon tube downward and variations in the amount of liquid within the gasoline tank will affect the mercury within the U-shaped tube and will cause corresponding variations in the height of the liquid within the leg 4, which variations will be indicated by the means hereinafter described.

The means for indicating variations in the height of the mercury within the leg 4 of the U-shaped tube comprises a float 17 of approximately egg shape, which may be of hard rubber or other suitable material and molded or otherwise secured to the lower end of a stem 18 of any suitable metal, provided at its upper end with an eye 19 arranged on a crank 20 of shaft 21. The crank shaft 21 is journaled in suitable bearings of a circular head 22 and a lug 23 of the body and the upper end of the stem 18 of the float is maintained in proper position on the crank bend by means of suitable spacing sleeves 24 pinched on the crank bend at opposite sides of the said stem. The spacing sleeves 24, which are split to enable them to be readily placed on the crank bend, will be firmly held in position on the crank by friction.

The circular head 22 is provided with a central bearing opening 25 for the reception of the front end of the crank shaft 21 and it is equipped with a graduated scale 26 over which moves a pointer 27, carried by the crank shaft and actuated by the float 17 which rests upon the mercury in the leg 4 of the U-shaped tube 6. As the mercury in the leg 4 rises and falls, due to the filling of the tank and the consumption of the gasoline or other liquid fuel, the variations in the amount of liquid fuel in the tank will be indicated by the pointer 27. The circular head 22 is provided with exterior die cast threads 28, which are engaged by similar interior threads 29 of a removable ring 30, having a front flange 31 and adapted to confine a plate 32 of glass or other transparent material over the indicating means in spaced relation with the circular head. A sleeve 33 is arranged within the ring for supporting the glass or other transparent plate 32 in spaced relation with the circular head 22.

The connection between the valve fitting and the U-shaped tube and the suction or vacuum tube will be air tight and the valve will be firmly held on its seat both by atmospheric pressure and by gravity, so that there will be no liability of the valve being accidentally thrown from its seat. The weight of the mercury will be sufficient to maintain the gasoline within the suction pipe after the air has been exhausted therefrom, so that even should the gasoline be entirely consumed from the tank of a machine the gasoline will not be withdrawn from the suction pipe which will be in proper condition or filled with gasoline so that the device will function as soon as the tank is re-filled. By constructing the body portion of the device of a casting and a U-shaped metal tube and securing the parts, as heretofore explained, with the valve fitting in the upper end of one leg of the U-shaped tube, the device may be cheaply manufactured and quickly assembled and the transverse disposition of the U-shaped tube will prevent the speed of the vehicle from affecting the levels of the mercury within the U-shaped tube. Also the position of the machine in ascending and descending grades will not change the relation of the legs of the tubes to each other and will not affect the reading of the gauge.

What is claimed is:

A gasoline gauge including a body provided at the front with a circular head and having spaced openings in the body at the rear of the head, a lug carried by the body and spaced from the head, a U-tube having its legs respectively secured in the openings of the said body and adapted to contain mercury, means for connecting one of the legs of the tube with a suction or vacuum pipe, a float adapted to operate in the other leg and provided with a stem, a crank shaft connected with the upper end of the stem and supported by the lug and the head and indicating means connected to and operated by the shaft.

In testimony whereof I have hereunto set my hand.

ELDRIDGE NAIRNE.